United States Patent [19]

Lundy et al.

[11] Patent Number: 4,874,802

[45] Date of Patent: Oct. 17, 1989

[54] POLYCARBONATE COMPOSITIONS RESISTANT TO GAMMA RADIATION

[75] Inventors: Charles E. Lundy; Sivaram Krishnan, both of Pittsburgh; Gerard E. Reinert, McMurray, all of Pa.

[73] Assignee: Mobay Corporation, Pittsburgh, Pa.

[21] Appl. No.: 207,601

[22] Filed: Jun. 16, 1988

[51] Int. Cl.$^4$ ............................................. C08K 5/34
[52] U.S. Cl. ..................... 524/94; 524/243; 524/367; 524/378
[58] Field of Search ................ 524/94, 367, 378, 243; 522/79

[56] References Cited

U.S. PATENT DOCUMENTS

| | | | |
|---|---|---|---|
| 3,907,744 | 9/1975 | Anderson | 524/367 |
| 4,460,445 | 7/1984 | Rekers | 204/159 |
| 4,624,972 | 11/1986 | Nace | 523/136 |
| 4,657,949 | 4/1987 | Nace | 523/137 |
| 4,786,671 | 11/1988 | Kress et al. | 524/99 |

FOREIGN PATENT DOCUMENTS 1520128 8/1985 European Pat. Off. .
228525 7/1987 European Pat. Off. .

*Primary Examiner*—John Kight
*Assistant Examiner*—Kriellion Morgan
*Attorney, Agent, or Firm*—Gene Harsh; Joseph C. Gil; Aron Preis

[57] ABSTRACT

The invention relates to thermoplastic polycarbonate molding compositions comprising a polycarbonate resin and a stabilizing agent conforming to

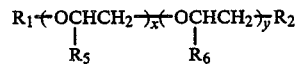

where $R_1$ and $R_2$ independently are

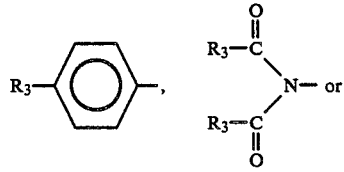

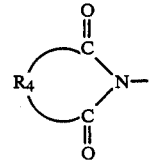

$R_3$ is a hydrogen atom, a branched or linear $C_1$-$C_{20}$ alkyl or a $C_1$-$C_{20}$ cycloalkyl, and $R_5$ and $R_6$ independently are a hydrogen atom or a $C_1$-$C_3$ alkyl, x is an integer of about 1 to 70, y is an integer of about 0 to 70, $R_4$ is $C_2$-$C_6$ alkyl or cycloalkyl, $C_6$-$C_{10}$ aryl or $C_7$-$C_{20}$ alkylaryl or cycloalkylaryl. The agent is homogenically distributed throughout the resin and is present in an amount sufficient to improve the gamma radiation resistance of the composition.

6 Claims, No Drawings

POLYCARBONATE COMPOSITIONS RESISTANT TO GAMMA RADIATION

FIELD OF THE INVENTION

The invention is directed to polycarbonate molding compositions and more particularly, to thermoplastic compositions resistant to gamma radiation.

SUMMARY OF THE INVENTION

The invention relates to thermoplastic polycarbonate molding compositions comprising a polycarbonate resin and a stabilizing agent conforming to

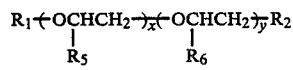

where $R_1$ and $R_2$ independently are

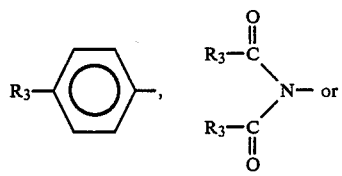

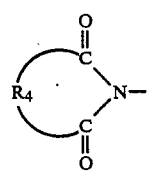

$R_3$ is a hydrogen atom, a branched or linear $C_1$-$C_{20}$ alkyl or a $C_1$-$C_{20}$ cycloalkyl, and $R_5$ and $R_6$ independently are
a hydrogen atom or a $C_1$-$C_3$ alkyl,
x is an integer of about 1 to 70,
y is an integer of about 0 to 70,
$R_4$ is $C_2$-$C_6$ alkyl or cycloalkyl; $C_6$-$C_{10}$ aryl or $C_7$-$C_{20}$ alkylaryl or cycloalkylaryl. The agent is homogeneously distributed throughout the resin and is present in an amount sufficient to improve the gamma radiation resistance of the composition.

BACKGROUND OF THE INVENTION

Because of its physical and mechanical properties polycarbonate resin was found to be eminently suitable for a variety of applications in the medical field. Applications which require sterilization by exposure to gamma radiation present a problem since polycarbonate tends to yellow and show increased haze. The art is noted to include U.S. Pat. No. 4,624,972 which disclosed polycarbonate compositions resistant to gamma radiation containing an ester of an aromatic polycarboxylic acid. European patent application 152,012 disclosed a method for increasing the ionizing radiation resistance of polycarbonate by including in the composition a non-polymeric compound which is characterized by a strong oxidizing action and/or reaction at high reaction rate with active species such as E or OH radicals and/or hydrated electrons formed by ionizing radiation. Radiation stable polyolefin compositions containing benzaldehyde acetals have been disclosed in U.S. Pat. No. 4,460,445. Polycarbonate compositions which are rendered gamma-ray resistant by the incorporation of polyether polyols are disclosed in European patent application 228,525. The incorporation of certain sorbate compounds was disclosed in U.S. Pat. No. 4,657,949 to improve the gamma-ray resistance of carbonate polymers.

DETAILED DESCRIPTION OF THE INVENTION

The composition of the invention comprises a polycarbonate resin and a stabilizing agent in an amount sufficient to enhance the resistance of the resin to yellowness and to the formation of haze upon exposure to gamma radiation. Preferably, the composition contains about 0.1 to 10.0 percent of the stabilizing agent.

The polycarbonate resins useful in the practice of the invention are homopolycarbonates, copolycarbonates and terpolycarbonates or mixtures thereof. The polycarbonates generally have a weight average molecular weight of 10,000–200,000, preferably 20,000–80,000 and their melt flow rate, per ASTM D-1238 at 300° C., is about 1 to about 65 gm/10 min., preferably about 2–15 gm/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, 1964, all incorporated herein by reference).

In the present context, dihydroxy compounds suitable for the preparation of the polycarbonates of the invention conform to the structural formulae (1) or (2)

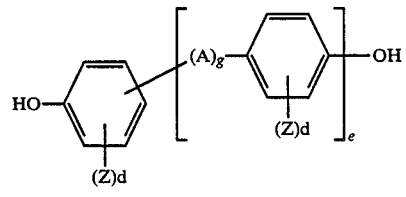

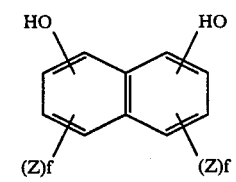

wherein
A denotes an alkylene group with 1 to 8 carbon atoms, an alkylidene group with 2 to 8 carbon atoms, a cycloalkylene group with 5 to 15 carbon atoms, a carbonyl group, an oxygen atom, a sulfur atom, —SO— or —SO$_2$— or a radical conforming to

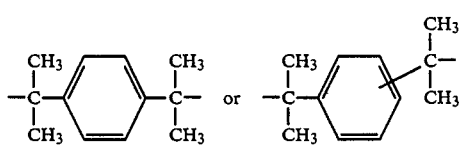

e and g both denote the number 0 to 1; Z denotes F, Cl, Br or $C_1$-$C_4$-alkyl and if several Z radicals are substituents in one aryl radical, they may be identical or different one from the other; d denotes an integer of from 0 to 4; and f denotes an integer of from 0 to 3.

Among the dihydroxy compounds useful in the practice of the invention are hydroquinone, resorcinol, bis-(hydroxyphenyl) alkanes, bis-(hydroxyphenyl) ethers, bis-(hydroxyphenyl)-ketones, bis-(hydroxyphenyl)-sulfoxides, bis-(hydroxyphenyl)-sulfides, bis-(hydroxyphenyl)-sulfones, and α,α'-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol-A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol-A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05-2.0 mol % (relative to the bisphenols) of polyhydroxyl compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, under the tradenames Makrolon FCR, Makrolon 2600, Makrolon 2800 and Makrolon 3100, all of which are bisphenol A based homopolycarbonate resins differing in terms of their respective molecular weights and characterized in that their melt flow indices (MFR) per ASTM D-1238 are about 16.5-24, 13-16, 7.5-13.0 and 3.5-6.5 gm/10 min., respectively. These are products of Mobay Corporation of Pittsburgh, Pa.

The stabilization agent in accordance with the present invention is a compound conforming structurally to

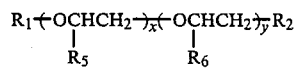

where $R_1$ and $R_2$ independently are

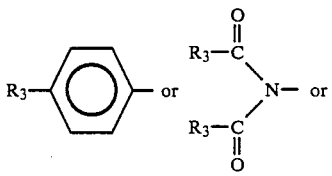

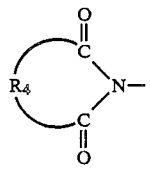

where
$R_3$ is a hydrogen atom, a branched or linear $C_1$–$C_{20}$ alkyl or a $C_1$–$C_{20}$ cycloalkyl, preferably a hydrogen atom or a $C_1$–$C_{10}$ alkyl radical, $R_5$ and $R_6$ independently are a hydrogen atom or a $C_1$–$C_3$ alkyl radical preferably a hydrogen atom or a methyl radical, x is an integer of about 1 to 70, preferably 1 to about 30, more preferably 1 to 5, y is an integer of about 0 to 70, preferably 1 to about 30, most preferably 1 to 5, $R_4$ is $C_2$–$C_6$ alkyl or cycloalkyl, $C_6$–$C_{10}$ aryl or $C_7$–$C_{20}$ alkylaryl or cycloalkylaryl.

A preferred agent conforming to

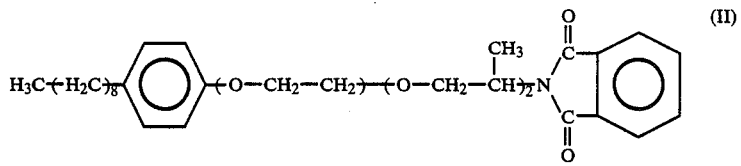 (II)

has been prepared and was used in the several experiments the summary of which is presented below.

The invention is further illustrated, but is not intended to be limited by the following examples in which all parts and percentages are by weight unless otherwise specified.

EXAMPLES

EXAMPLE 1

Preparation of a stabilizer—polyalkylene oxide phthalimide

A polyether conforming structurally to Formula II above was prepared by reacting 250 gm of Jeffamine-750—a commercial product of Texaco conforming to

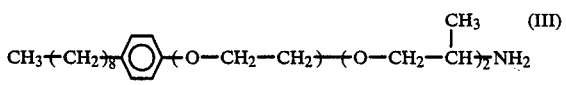 (III)

with 51 gm of phthalic anhydride in 400 ml of toluene, in a 1 liter—3 necked flask equipped with an agitator and a Dean stark trap with a condenser. The materials were charged into the flask and the temperature raised to 112° F. After reflux and azeotropic removal of water the reaction was allowed to cool.

EXAMPLE 2

Compositions of the invention containing the stabilizer which was prepared in accordance with Example 1 above were evaluated as to their optical properties (Yellowness Index=YI) both before and after exposure to gamma radiation. The Tables below summarize the results of the evaluation and include a comparison between compositions containing no stabilizer and composition containing 0.5% and 1% of the stabilizer. In the comparisons the polycarbonate resin was Makrolon 2608 which is a bisphenol-A based homopolymer having a melt flow index of about 12–16 gm/10 min. The test specimens which were tested and reported in Table 1 were molded at 550° F. and the one in Table 2 were molded at 650° F.

TABLE 1

| Composition | YI (before radiation) | YI (after 5.0 Mrads) |
| --- | --- | --- |
| Makrolon 2608 | 3.95 | 13.07 |
| Makrolon 2608 with 0.5% polyalkylene oxide phthalimide | 3.92 | 11.51 |
| Makrolon 2608 with 1.0% polyalkylene oxide phthalimide | 4.25 | 9.25 |

TABLE 2

| Composition | YI (before radiation) | YI (after 5.0 Mrads) |
| --- | --- | --- |
| Makrolon 2608 | 4.20 | 12.60 |
| Makrolon 2608 with 0.5% polyalkylene oxide phthalimide | 4.30 | 10.67 |
| Makrolon 2608 with 1.0% polyalkylene oxide phthalimide | 4.70 | 8.62 |

The compositions of the invention may be prepared by following conventional procedures for the preparation of thermoplastic polycarbonate molding compositions. The stabilizing agent may be introduced by directly mixing it with the polycarbonate. Other conventional additives may also be incorporated in the composition for their art-recognized utility. These include release agents, plasticizers, other stabilizers, antioxidants, fillers, reinforcements and the like.

Although the invention has been described in detailed in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polycarbonate molding composition comprising a homogeneous blend of (i) an aromatic polycarbonate resin and (ii) a stabilizing agent conforming to $$R_1(OCHCH_2)_x(OCHCH_2)_y R_2$$
$$\qquad\quad R_5 \qquad\quad R_6$$

where $R_1$ and $R_2$ independently denote

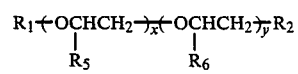 or 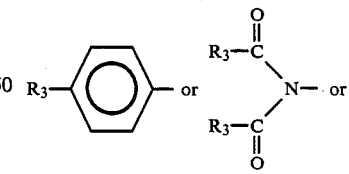 or

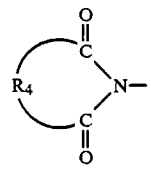

where
$R_3$ is a hydrogen atom, a branched or linear $C_1$–$C_{20}$ alkyl or a $C_1$–$C_{20}$ cycloalkyl, $R_5$ and $R_6$ independently are a hydrogen atom or a $C_1$–$C_3$ alkyl radical, x is an integer of about 1 to 70, y is an integer of about 0 to 70, $R_4$ is $C_2$–$C_6$ alkyl or cycloalkyl, $C_6$–$C_{10}$ aryl or $C_7$–$C_{20}$ alkylaryl or cycloalkylaryl, said (ii) being present in the composition in an amount sufficient to render the composition improved resistance to gamma radiation.

2. The composition of claim 1 wherein said sufficient amount is about 0.05 to 10 percent relative to the weight of the composition.

3. The composition of claim 1 wherein said (ii) conforms to

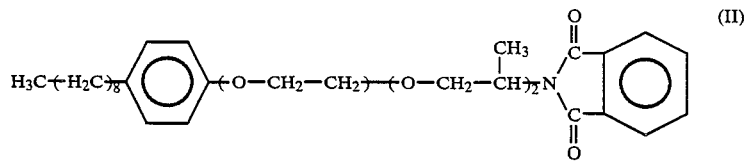

4. The composition of claim 1 wherein said polycarbonate is a homopolymer based on bisphenol A.

5. In the process of injection molding polycarbonate articles the improvement comprising using the molding composition of claim 1.

6. The improvement of claim 5 wherein said stabilizing agent conforms to

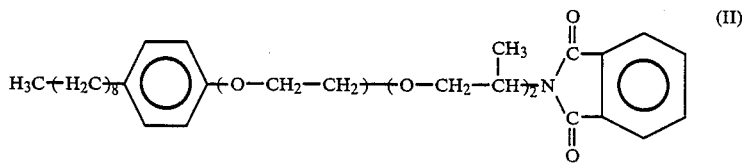

* * * * *